No. 830,308. PATENTED SEPT. 4, 1906.
P. A. DIETZ.
COMBINED MEASURE AND WEIGHING DEVICE.
APPLICATION FILED JAN. 5, 1906.
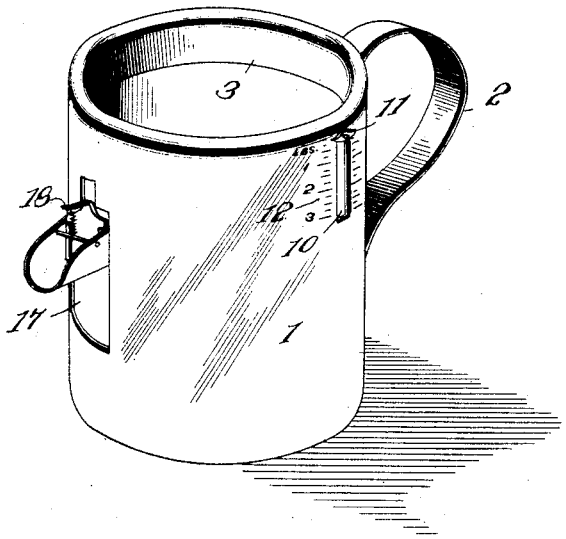
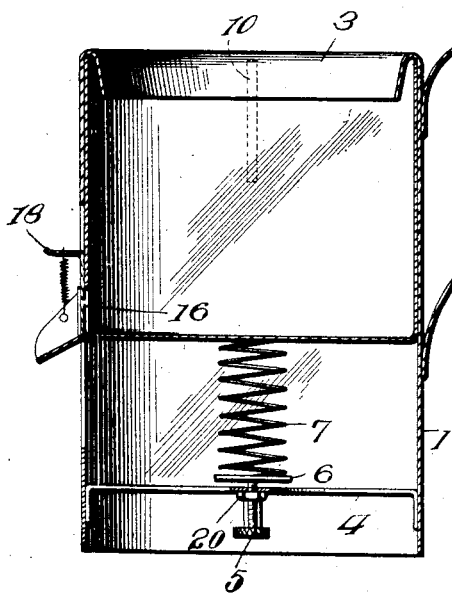
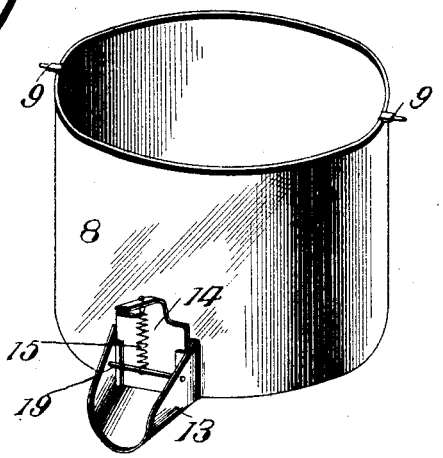
Witnesses
Inventor
P. A. Dietz
By Watson E. Coleman
Attorney

UNITED STATES PATENT OFFICE.

PAUL A. DIETZ, OF JOPLIN, MISSOURI.

COMBINED MEASURE AND WEIGHING DEVICE.

No. 830,308.     Specification of Letters Patent.     Patented Sept. 4, 1906.

Application filed January 5, 1906. Serial No. 294,762.

*To all whom it may concern:*

Be it known that I, PAUL A. DIETZ, a citizen of the United States, residing at Joplin, in the county of Jasper and State of Missouri, have invented certain new and useful Improvements in a Combined Measure and Weighing Device, of which the following is a specification, reference being had therein to the accompanying drawings.

My invention relates to a combined measure and weighing-scale particularly adapted for use in grocery-stores and the like in weighing various commodities—such as coffee, peas, beans, rice, &c.—and which shall be simple and inexpensive in construction and effective in operation and which shall have means for discharging a part of the contents into a bin or other receptacle when more than the required amount is conveyed to the measuring-receptacle.

In the drawings accompanying the specification and made a part hereof, Figure 1 is a perspective view of the complete device. Fig. 2 is a vertical section through the center thereof, and Fig. 3 is a perspective view of the measuring and weighing receptacle.

Like reference-numerals designate corresponding parts in all the figures of the drawings.

1 designates an outer cylindrical shell or casing open at the bottom and top and provided with a handle 2. Formed integral with the upper end of said casing is an interior overhanging rim or flange 3, and mounted in said casing at a point near the bottom thereof is a frame or support 4, having mounted at the center thereof a set-screw 5, the upper end of which passes through the frame and supports a plate 6, against which bears the lower end of a coil-spring 7. This coil-spring supports the weighing and measuring receptacle 8, which is slidably mounted in the outer shell or casing 1. Mounted at the top of the weighing and measuring receptacle 8 are two laterally-projecting points 9, which extend through the vertical slots 10 in the casing 1, each of said lugs having mounted on its outer end a pointer 11, registering according to the weight of the contents in the receptacle, with graduations 12 on the exterior of said casing. The receptacle 8 is further provided with a spout 13, having a gate 14 slidably mounted therein against the tension of a spring 15, which gate is adapted to open or close an opening 16 in the receptacle 8, through which entrance to said spout is effected. This spout 13 is adapted to slide up and down in a vertical opening 17 in the outer casing 1.

In operation the contents to be weighed are placed in the receptacle 8 and the weight thereof determined by the registration of the pointer 11 with the graduations 12 on the exterior of the casing, said graduations indicating pounds, ounces, or fractions thereof. When more of a commodity than is desired is inadvertently placed in the receptacle, the surplus contents may be easily removed to the bin or emptied out by raising the gate 14 against the tension of the spring 15 and permitting the contents to leave the receptacle through the openings 16 and slide down the spout 13. It will be observed that the gate 14 is provided with a laterally-projecting handle 18, formed integral therewith for the purpose of more easily raising and lowering the same, the coil-spring 15 being preferably connected with the handle at one end and with the spout at the other by means of a rod 19 carried by the spout. The function of the overhanging flange or rim 3 is to serve as a sort of hopper and to prevent anything from getting between the outer casing and the receptacle which would in any wise retard its vertical movement. In order to afford perfect adjustment of the weighing features, I provide the set-screw 5, which when the tension of the spring becomes lessened by age or wear can be screwed up against the plate 6 to tighten said spring. If preferred, the lower end of the spring 7 can be fixed on the plate 6, and the upper end of the set-screw can also be fixed on said plate, so that the plate will turn against the tension of the spring, and this will more effectually tighten the spring when desired, there being provided a jam-nut 20 to hold the set-screw from reversing.

Having thus described my said invention, what I claim as new, and desire to secure by Letters Patent of the United States, is—

1. In a device of the character described, an outer casing having a vertical slot therein and graduations arranged adjacent thereto, said casing being also provided with an interior overhanging rim or flange formed integral with the top thereof, a receptacle mounted inside of the casing and supported by a spring, a spout carried by said receptacle, means for opening and closing said spout, and an indicator carried by said receptacle and arranged to register with the graduations on the casing.

2. In a device of the character described, an outer casing having a vertical slot therein and graduations arranged adjacent thereto, said casing being also provided with an interior overhanging rim or flange formed integral with the top thereof, a receptacle mounted inside of the casing and supported by a spring, a spout carried by said receptacle and arranged to travel in an opening in the outer casing, means for opening and closing said spout, and an indicator carried by said receptacle and arranged to register with the graduations on the casing.

3. In a device of the character described, an outer cylindrical casing having a vertical slot therein and graduations arranged adjacent thereto, said casing being provided at its top with an interior overhanging rim or flange formed integral therewith, a cylindrical receptacle mounted inside of the casing and supported by a spring against the tension of which it is adapted to bear, a spout carried by said receptacle and traveling in an opening in the casing, a gate slidably mounted in the spout and adapted to open and close an opening in the receptacle opposite said spout, a spring connected with, and exerting its tension against, the gate to automatically close the same, and an indicator carried by the receptacle and arranged to register with the graduations on the casing.

In testimony whereof I hereunto affix my signature in presence of two witnesses.

PAUL A. DIETZ.

Witnesses:
I. W. SPARKER,
D. A. HUBBARD.